US009256113B2

(12) United States Patent
Han et al.

(10) Patent No.: US 9,256,113 B2
(45) Date of Patent: Feb. 9, 2016

(54) PLASMONIC MODULATOR AND OPTICAL APPARATUS INCLUDING THE SAME

(71) Applicant: SAMSUNG ELECTRONICS CO., LTD., Suwon-si (KR)

(72) Inventors: Seung-hoon Han, Seoul (KR); Wan-joo Maeng, Seoul (KR); Sang-yoon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 231 days.

(21) Appl. No.: 13/773,357

(22) Filed: Feb. 21, 2013

(65) Prior Publication Data
US 2013/0215483 A1    Aug. 22, 2013

(30) Foreign Application Priority Data
Feb. 22, 2012   (KR) .................. 10-2012-0018052

(51) Int. Cl.
G03H 1/08   (2006.01)
G02F 1/01   (2006.01)
G02F 1/03   (2006.01)
G02F 1/19   (2006.01)
G02F 1/23   (2006.01)

(52) U.S. Cl.
CPC ... G02F 1/19 (2013.01); G02F 1/23 (2013.01)

(58) Field of Classification Search
None
See application file for complete search history.

(56) References Cited

U.S. PATENT DOCUMENTS

| | | | |
|---|---|---|---|
| 6,034,809 A * | 3/2000 | Anemogiannis | 359/254 |
| 7,693,363 B2 | 4/2010 | Dionne et al. | |
| 2008/0239458 A1 | 10/2008 | Sachs et al. | |
| 2009/0042053 A1 * | 2/2009 | Lin | 428/613 |
| 2011/0109956 A1 * | 5/2011 | Hashimura et al. | 359/290 |
| 2012/0057215 A1 * | 3/2012 | Suh et al. | 359/280 |

FOREIGN PATENT DOCUMENTS

| | | |
|---|---|---|
| JP | 07-043739 A | 2/1995 |
| JP | 09-033942 A | 2/1997 |
| WO | WO-99/49353 A1 | 9/1999 |

OTHER PUBLICATIONS

Feigenbaum, Eyal, et al., (May 18, 2010). "Unity-Order Index Change in Transparent Conducting Oxides at Visible Frequencies." *NANO Letters.* 10: pp. 2111-2116.
Liu, Na, et al. (Jun. 18, 2010). "Infrared Perfect Absorber and Its Applications as Plasmonic Sensor." *NANO Letters.* 10; pp. 2342-2348.
E.P. Gusev, et al., "Growth and characterization of ultrathin nitrided silicon oxide films," Journal of Research and Development, vol. 43, No. 3, May 1999, pp. 265-286.
H.J. Cho, et al., "Novel Nitrogen Profile Engineering for Improved TaN/HfO2/Si MOSFET Performance," Proceeding from the International Electron Devices Meeting (IEDM '01), held at Washington, DC, on Dec. 2-5, 2001 pp. 30.2.1-30.2.4.
R. Iijima, et al., "Experimental Clarification of Mobility Determining Factors in HfSiON CMISEFETs with Various Film Compositions," Proceedings from International Electro Devices Meeting (IEDM '05), held at Washington, DC, on Dec. 5, 2005 (4 pages, in English).
A. Boltasseva, et al., "Low-Loss Plasmonic Metamaterials," Materials Science, Science Magazine, vol. 331, Jan. 21, 2011, pp. 290-291 (3 pages, in English).

* cited by examiner

*Primary Examiner* — Jade R Chwasz
(74) *Attorney, Agent, or Firm* — NSIP Law

(57) ABSTRACT

A plasmonic modulator and an optical apparatus including the same are provided. The plasmonic modulator includes a first metal layer, and a second metal layer facing the first metal layer. The plasmonic modulator further includes a refractive index varying layer disposed between the first and second metal layers and including a varying refractive index, and an insulating nitride layer disposed between the refractive index varying layer and the first metal layer.

28 Claims, 9 Drawing Sheets

PLASMONIC MODULATOR AND OPTICAL APPARATUS INCLUDING THE SAME

CROSS-REFERENCE TO RELATED APPLICATION

This application claims the benefit under 35 U.S.C. §119(a) of Korean Patent Application No. 10-2012-0018052, filed on Feb. 22, 2012, in the Korean Intellectual Property Office, the entire disclosure of which is incorporated herein by reference for all purposes.

BACKGROUND

1. Field

The following description relates to plasmonic modulators and optical apparatuses including the same.

2. Description of the Related Art

Optical modulators according to the related art control flow characteristics of light, such as a direction and a degree of transmission/reflection, by using a mechanical movement of a light blocking/varying element or liquid crystal, a microelectromechanical system (MEMS) structure, and/or other devices known to one of ordinary skill in the art. In such optical modulators, an operating response time is long, that is, about several μs or more, due to characteristics of their driving methods.

Thus, optical modulators driven by using an electrooptic method (hereinafter, referred to as electrooptic modulators) have been suggested. Electrooptic modulators may have a relatively fast operating speed, but may require an electrooptic medium with a large volume and a large driving voltage. In addition, a leakage current is generated due to the large driving voltage.

SUMMARY

In one general aspect, there is provided a plasmonic modulator including a first metal layer, and a second metal layer facing the first metal layer. The plasmonic modulator further includes a refractive index varying layer disposed between the first and second metal layers and including a varying refractive index, and an insulating nitride layer disposed between the refractive index varying layer and the first metal layer.

In another general aspect, there is provided an optical apparatus including a plasmonic modulator including a first metal layer, and a second metal layer facing the first metal layer. The plasmonic modulator further includes a refractive index varying layer disposed between the first and second metal layers and including a varying refractive index, and an insulating nitride layer disposed between the refractive index varying layer and the first metal layer.

Other features and aspects may be apparent from the following detailed description, the drawings, and the claims.

Figure 1:
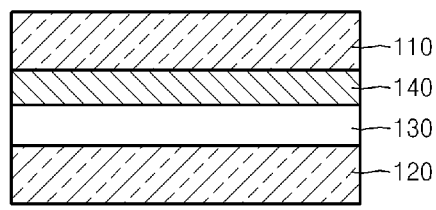
FIG. 1 is a schematic cross-sectional view illustrating an example of a plasmonic modulator.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It is understood that the features of the present disclosure may be embodied in different forms and should not be construed as limited to the example(s) set forth herein. Rather, example(s) are provided so that this disclosure will be thorough and complete, and will convey the full scope of the present disclosure to those skilled in the art. The drawings may not be necessarily to scale, and, in some instances, proportions may have been exaggerated in order to clearly illustrate features of the example(s). When a first layer is referred to as being "on" a second layer or "on" a substrate, it may not only refer to a case where the first layer is formed directly on the second layer or the substrate but may also refer to a case where a third layer exists between the first layer and the second layer or the substrate.

FIG. 1 is a schematic cross-sectional view illustrating an example of a plasmonic modulator 10. Referring to FIG. 1, the plasmonic modulator 10 includes first and second metal layers 110 and 120, which face each other and are spaced apart from each other by a predetermined distance. The plasmonic modulator 10 further includes a refractive index varying layer 130 disposed between the first and second metal layers 110 and 120 and including a varying refractive index. The plasmonic modulator 10 further includes an insulating nitride layer 140 disposed between the refractive index varying layer 130 and the first metal layer 110 and including nitrogen (N).

The predetermined distance between the first metal layer 110 and the second metal layer 120 may be less than or equal to about 100 nm. The first and second metal layers 110 and 120 are used to apply an electrical signal to the refractive index varying layer 130, and may be formed of the same material or different materials. For example, the first metal layer 110 may be formed of gold (Au), silver (Ag), copper (Cu), lead (Pb), indium (In), tin (Sn), cadmium (Cd), and/or other metals known to one of ordinary skill in the art. In addition, the second metal layer 120 may be formed of a metal that easily induces generation of a surface plasmon. For example, the second metal layer 120 may be formed of Au, Ag, Cu, Pb, In, Sn, Cd, and/or other metals known to one of ordinary skill in the art.

The refractive index varying layer 130 is formed of a material including the refractive index that varies with the electrical signal applied to the refractive index varying layer 130, for example, an electromagnetic field. The variation of the refractive index may also include a variation of a concentration of particles with the electrical signal applied to the refractive index varying layer 130. For example, the refractive index varying layer 130 may be formed of a material with an electro-optical effect (i.e., an electro-optic material), such as a crystal of $KTa_{1-x}Nb_xO_3(0 \le x \le 1)$(KTN), $LiNbO_3$(LN), $Pb(ZrO_{1-x}Ti_x)O_3(0 \le x \le 1)$(PZT), or DAST(4-dimethylamino-N-methyl-4 stilbazolium). Alternatively, the refractive index varying layer 130 may include a crystalline material of a transparent conductive oxide (TCO). The transparent conductive oxide (TCO) may include indium tin oxide (ITO), or zinc oxide (ZnO)-based oxide, such as indium zinc oxide (IZO), aluminum zinc oxide (AZO), and gallium zinc oxide (GZO). A refractive index of the TCO varies with an electrical signal applied to the TCO.

When the refractive index of the refractive index varying layer 130 varies, plasmon and light characteristics associated with the refractive index varying layer 130 may vary. For example, the variation of the refractive index may induce modulation of a light response. In more detail, the variation of the refractive index may induce a variation of an operating wavelength of light, a variation of an output intensity of the light, and/or a variation of an output phase of the light.

The insulating nitride layer 140 may be formed of a material obtained by nitrifying an insulating material. Alternatively, the insulating nitride layer 140 may be formed of a crystalline material obtained by mixing GaN, AlN, InN, and/or BN with an III-V-group compound semiconductor formed as a nitride layer. The insulating nitride layer 140 is disposed between the first metal layer 110 and the refractive index varying layer 130 to prevent a leakage current from flowing from the first metal layer 110 to the refractive index varying layer 130. Thus, on a surface of the refractive index varying layer 130 that is adjacent to the insulating nitride layer 140, a density of electrons of the refractive index varying layer 130 varies. Also, an electron energy band of the refractive index varying layer 130 varies so that a dielectric constant and the refractive index of the refractive index varying layer 130 vary as well. Accordingly, a surface plasmon distributed on an interface between the refractive index varying layer 130 and the insulating nitride layer 140, and a light response associated with the refractive index varying layer 130, may vary.

Figure 2:
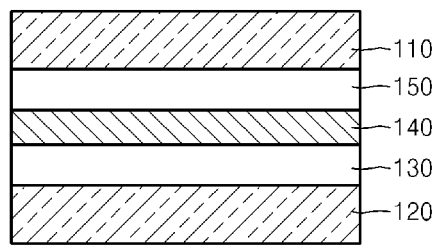
FIGS. 2 through 4 are schematic cross-sectional views illustrating other examples of plasmonic modulators each including an insulating layer.
Figure 3:
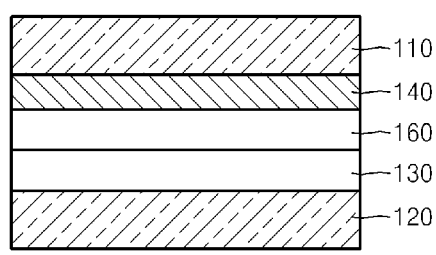
Figure 4:
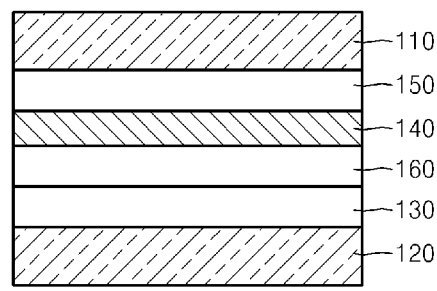

FIGS. 2 through 4 are schematic cross-sectional views illustrating other examples of plasmonic modulators 20, 30, and 40 each including an insulating layer disposed between the first metal layer 110 and the refractive index varying layer 130. As illustrated in FIG. 2, the plasmonic modulator 20 further includes a first insulating layer 150 disposed between the first metal layer 110 and the insulating nitride layer 140.

As illustrated in FIG. 3, the plasmonic modulator 30 further includes a second insulating layer 160 disposed between the insulating nitride layer 140 and the refractive index varying layer 130. Alternatively, as illustrated in FIG. 4, the plasmonic modulator 40 further includes the first insulating layer 150 disposed between the first metal layer 110 and the insulating nitride layer 140, and the second insulating layer 160 disposed between the insulating nitride layer 140 and the refractive index varying layer 130.

When the plasmonic modulators 10, 20, 30, and 40 illustrated in FIGS. 1 through 4, respectively, are manufactured, the insulating nitride layer 140 and the first and second insulating layers 150 and 160 may be separately deposited. Alternatively, after an insulating material is deposited on the refractive index varying layer 130, a portion of the insulating material may be nitrified to form the insulating nitride layer 140, and another portion of the insulating material may be used to form the first insulating layer 150 and/or the second insulating layer 160. For example, the insulating material may include $ZrO_2$, $TiO_2$, MgO, $CeO_2$, $Al_2O_3$, $HfO_2$, NbO, and/or $SiO_2$. In this example, when the whole insulating material is nitrified, the plasmonic modulator 10 illustrated in FIG. 1 is obtained. When a lower region of the insulating material is nitrified, the plasmonic modulator 20 illustrated in FIG. 2 is obtained. When an upper region of the insulating material is nitrified, the plasmonic modulator 30 illustrated in FIG. 3 is obtained. When a middle region of the insulating material is nitrified, the plasmonic modulator 40 illustrated in FIG. 4 is obtained.

As described above, the insulating nitride layer 140 is disposed between the refractive index varying layer 130 and the first metal layer 110 to prevent a leakage current from flowing from the first metal layer 110 to the refractive index varying layer 130. Thus, a surface plasmon may be concentratively generated in a space between the refractive index varying layer 130 and the insulating nitride layer 140. Hereinafter, an area in which a surface plasmon is formed on the first metal layer 110 and on the second metal layer 120, is referred to as an active layer. In other words, the active layer includes an area between the first and second metal layers 110 and 120. The active layer includes the refractive index varying layer 130 and the insulating nitride layer 140, and may include the first and second insulating layers 150 and 160. A thickness of the active layer may be nano-sized to form a surface plasmon on the active layer. For example, the thickness of the active layer may be less than or equal to less about 100 nm.

The plasmonic modulators 10, 20, 30, and 40 illustrated in FIGS. 1 through 4, respectively, may be used in various optical apparatuses, such as a display apparatus, an image capturing apparatus, and/or other optical apparatuses known to one of ordinary skill in the art. The plasmonic modulators 10, 20, 30, and 40 may perform various functions according to each optical modulation structure. Examples of the plasmonic modulator 10, 20, 30, or 40 may include a waveguide type plasmonic modulator configured to modulate plasmonic light that is applied to a plasmonic light waveguide and proceeds in a predetermined direction, a cavity type plasmonic modulator configured to modulate plasmonic light in a plasmonic nanostructure and a cavity structure. The examples of the plasmonic modulator 10, 20, 30, or 40 may further include a resonance type plasmonic modulator configured to modulate reflection, absorption, and transmission characteristics of light incident on a free space by arranging the plasmonic nanostructure and the cavity structure in a two-dimensional or three-dimensional manner with a period that is less than or equal to a wavelength of the light.

Figure 5:
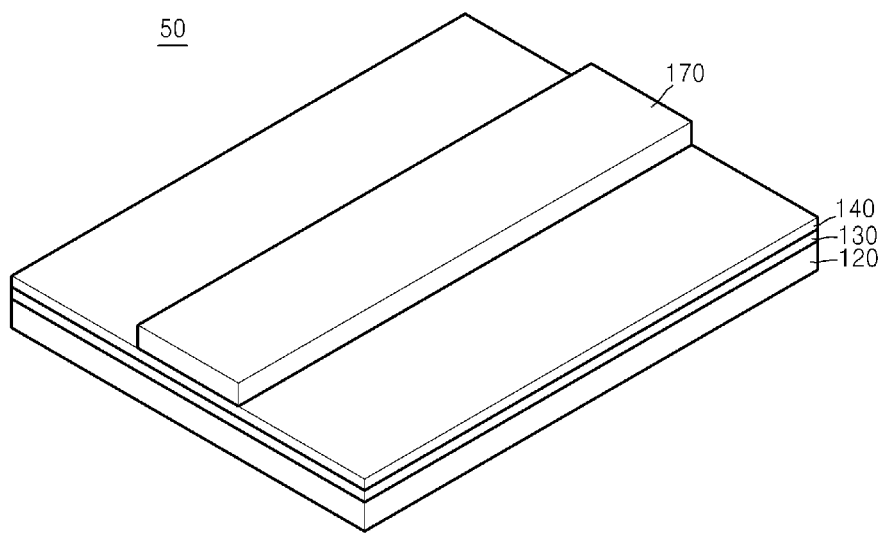
FIG. 5 is a perspective view illustrating an example of a waveguide type plasmonic modulator.

FIG. 5 is a perspective view illustrating an example of a waveguide type plasmonic modulator 50. Referring to FIG. 5, the waveguide type plasmonic modulator 50 includes a first metal layer 170 and the second metal layer 120, which face each other and are spaced apart from each other by a predetermined distance. The waveguide type plasmonic modulator 50 further includes the refractive index varying layer 130 disposed between the first and second metal layers 170 and 120 and including a varying refractive index. The waveguide type plasmonic modulator 50 further includes an insulating nitride layer 140 disposed between the refractive index varying layer 130 and the first metal layer 170 and including nitrogen (N).

Figure 6:
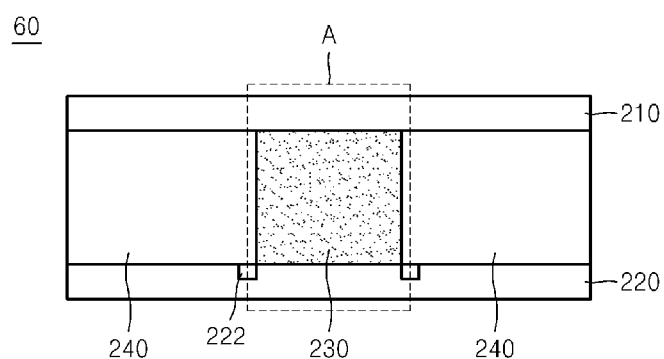
FIG. 6 is a schematic cross-sectional view illustrating an example of a cavity type plasmonic modulator.

The second metal layer 120, the refractive index varying layer 130, and the insulating nitride layer 140 that are illustrated in FIG. 5 correspond to the second metal layer 120, the refractive index varying layer 130, and the insulating nitride layer 140 that are illustrated in FIG. 1. A material of the first metal layer 170 of FIG. 5 corresponds to the material of the first metal layer 110 of FIG. 1. Since the plasmonic modulator 50 of FIG. 5 is of a waveguide type, the first metal layer 170 is disposed only in a region of the insulating nitride layer 140, and guides light in a predetermined direction. Accordingly, the waveguide type plasmonic modulator 50 of FIG. 5 may modify the plasmonic modulator 10 of FIG. 1, which may include the first metal layer 110 disposed in an entirety of the insulating nitride layer 140. In addition, the waveguide type plasmonic modulator 50 may be manufactured by modifying the plasmonic modulators 20, 30, and 40 of FIGS. 2, 3, and 4, respectively FIG. 6 is a schematic cross-sectional view illustrating an example of a cavity type plasmonic modulator 60. Referring to FIG. 6, a structure of a middle region A is the same as the structures of the plasmonic modulators 10, 20, 30, and 40 of FIGS. 1 through 4, respectively. That is, the cavity type plasmonic modulator 60 of FIG. 5 is manufactured by adding another material layer to the structures of the plasmonic modulators 10, 20, 30, and 40 of FIGS. 1 through 4, respectively. A surface plasmon generated in an external apparatus is incident on the cavity type plasmonic modulator 60, and the cavity type plasmonic modulator 60 modulates and emits the surface plasmon.

In more detail, the cavity type plasmonic modulator 60 includes first and second metal layers 210 and 220 that correspond to the first and second metal layers 110 and 120 illustrated in FIGS. 1 through 4. Thus, the first and second metal layers 210 and 220 of FIG. 6 may be formed of the same metal or different metals. The second metal layer 220 may be formed of a metal that easily induces generation of a surface plasmon. For example, the first and second metal layers 210 and 220 may be formed of a metal, such as Au, Ag, Cu, Pb, In, Sn, Cd, and/or other metals known to one of ordinary skill in the art. The first and second metal layers 210 and 220 function as a proceeding path for the surface plasmon.

The cavity type plasmonic modulator 60 further includes an active layer 230 and a second insulating layer 240. The active layer 230 is disposed between the first and second metal layers 210 and 220, and corresponds to the active layer or multi-layer disposed between the first and second metal layers 110 and 120 illustrated in FIGS. 1 through 4. That is, the active layer 230 includes the refractive index varying layer 130 and the insulating nitride layer 140, and may include first and second insulating layers 150 and 160, as illustrated in FIGS. 1 through 4. The second insulating layer 240 is also disposed between the first and second metal layers 210 and 220. The first and second metal layers 210 and 220 may be connected to a power supply, and may function as electrodes applying an electromagnetic field or electrical signal to the active layer 230 and the second insulating layer 240.

The active layer 230 and the second insulating layer 240 may be continuously disposed on the same plane between the first and second metal layers 210 and 220 in a proceeding direction of the surface plasmon, as illustrated in FIG. 6. Alternatively, a portion of the second insulating layer 240 may be disposed in an arbitrary region between the first metal layer 210 and the second metal layer 220, and the active layer 230 may be disposed in the other region between the first metal layer 210 and the second metal layer 220.

The second insulating layer 240 is formed of an insulating material including a nearly uniform refractive index regardless of voltages applied thereto by the first and second metal layers 210 and 220. That is, the nearly uniform refractive index of the second insulating layer 240 hardly varies due to an electric field formed between the first metal layer 210 and the second metal layer 220. For example, the second insulating layer 240 may be formed of silicon oxide ($SiO_2$) or silicon nitride ($SiN_x$). On the other hand, the active layer 230 includes the refractive index varying layer 130 including the refractive index that varies due to the electric field formed between the first metal layer 210 and the second metal layer 220.

The cavity type plasmonic modulator 60 further includes at least one groove 222 formed in a top surface of the second metal layer 220. The groove 222 is formed outside a region of the top surface of the second metal layer 220 on which the active layer 230 is disposed. The groove 222 may also be formed in a surface of the first metal layer 210, and outside a region of the surface of the first metal layer 210 in which the active layer 230 is disposed. Although the example of FIG. 6 illustrates the groove 222 formed in the second metal layer 220, aspects of the example are not limited thereto. In addition, an uneven portion of the first and second metal layers 210 and 220 may be formed outside the region of the surfaces of the first and second metal layers 210 and 220 in which the active layer 230 is disposed.

The surface plasmon incident on a left side of the cavity type plasmonic modulator 60 proceeds inside a surface of the cavity type plasmonic modulator 60, and is emitted to a right side of the cavity type plasmonic modulator 60. An intensity, a phase, and a proceeding direction of the surface plasmon may vary based on the variation of the refractive index of the refractive index varying layer 130 in the active layer 230.

Figure 7A:
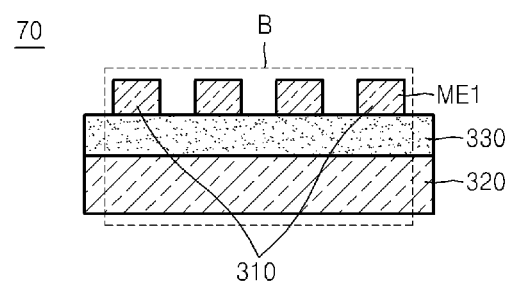
FIGS. 7A and 7B are a side view and a plan view, respectively, illustrating an example of a resonance type plasmonic modulator.
Figure 7B:
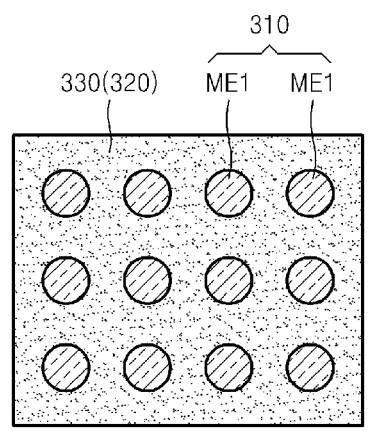

FIGS. 7A and 7B are a side view and a plan view, respectively, illustrating an example of a resonance type plasmonic modulator 70. Referring to FIG. 7A, a structure of a middle region B is the same as the structures of the plasmonic modulators 10, 20, 30, and 40 illustrated in FIGS. 1 through 4, respectively.

In more detail, the resonance type plasmonic modulator 70 includes first and second metal layers 310 and 320 that correspond to the first and second metal layers 110 and 120 illustrated in FIGS. 1 through 4, and thus, detailed descriptions thereof are omitted. The resonance type plasmonic modulator 70 further includes an active layer 330 disposed between the first and second metal layers 310 and 320 that corresponds to the active layer or multi-layer disposed between the first and second metal layers 110 and 120 illustrated in FIGS. 1 through 4, and thus, detailed descriptions thereof are omitted. Light may be incident on an upper side of the resonance type plasmonic modulator 70. When light is incident on the upper side of the resonance type plasmonic modulator 70, a surface plasmon is generated on the active layer 330, and the incident light is modulated due to the surface plasmon so that reflection, absorption, and transmission characteristics of the light vary.

The first metal layer 310 includes metal layer patterns. For example, as illustrated in FIGS. 7A and 7B, the first metal layer 310 includes metal layer elements ME1. The metal layer elements ME1 are arranged so that a space is formed between the adjacent metal layer elements ME1. A distance d between two adjacent centers of the metal layer elements ME1 may be less than or equal to $\lambda/2$, for example, less than or equal to $\lambda/3$. In this example, $\lambda$ indicates a resonant wavelength of the resonance type plasmonic modulator 70, i.e., a resonant wavelength of the metal layer elements ME1. A thickness t of each of the metal layer elements ME1 may be less than or equal to $\lambda/5$, for example, less than or equal to $\lambda/10$ and greater than or equal to $\lambda/20$. When the distance d between two adjacent centers of the metal layer elements ME1 satisfies the above condition, incident light may be transmitted or reflected without generating additional diffraction light. In addition, when the thickness t of each of the metal layer elements ME1 satisfies the above condition, a number of resonant wavelengths (absorption wavelengths) may not be excessively increased by 2 or more. The metal layer elements ME1 may function as a single medium or an effective medium.

An arrangement of the metal layer elements ME1 is not limited to FIGS. 7A and 7B, but may be modified in various ways. For example, the metal layer elements ME1 may be arranged to be spaced apart from each other by a predetermined distance, and to contact each other in a range in which an empty space therebetween is formed.

A structure of the metal layer elements ME1 is not limited to FIGS. 7A and 7B, and may be modified in various ways. For example, the metal layer elements ME1 may include various structures, as illustrated in FIG. 8.

Figure 8:
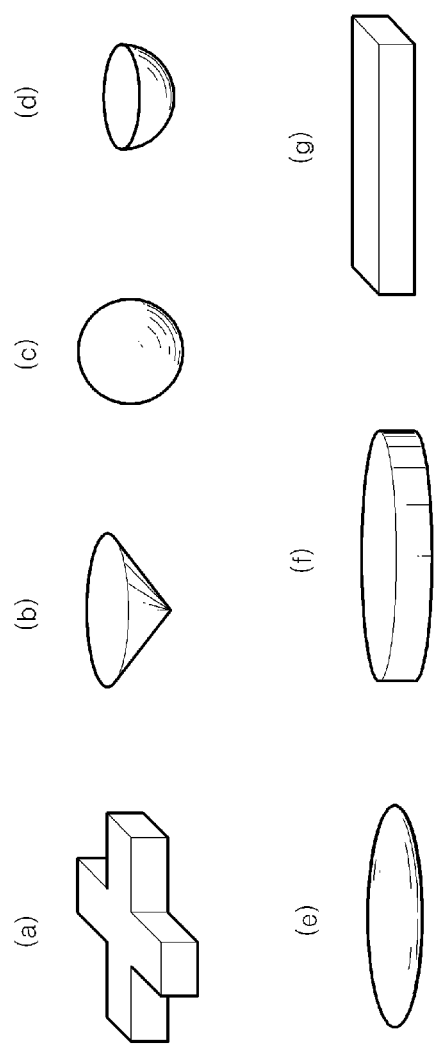
FIG. 8 is a perspective view illustrating examples of various structures of metal layer elements used in a plasmonic modulator.

FIG. 8 is a perspective view illustrating examples of various structures of metal layer elements ME1 used in a plasmonic modulator. Referring to FIG. 8, the metal layer elements ME1 may include various modification structures, such as a cross structure (a), a triangular pyramid structure (b), a sphere structure (c), a hemisphere structure (d), a grain of rice structure (e), an oval disk structure (f), and a stick structure (g). The cross structure (a), the triangular pyramid structure (b), the sphere structure (c), and the hemisphere structure (d) may be symmetrical structures, similar to a circular disk structure of FIG. 7B. Each of the grain of rice structure (e), the oval disk structure (f), and the stick structure (g) may be a non-symmetrical structure slanted to one direction. In addition, the metal layer elements ME1 may include a multi-layer structure in which layers overlap each other. For example, when each of the metal layer elements ME1 includes the sphere structure (c), each of the metal layer elements ME1 may include a core and at least one shell. Further, two or more metal layer elements ME1 including different structures may be arranged in one unit.

A resonant wavelength, a resonant wavelength width, resonant polarization characteristics, a resonant angle, an intensity of reflection/absorption/transmission, and phase characteristics of light may vary based on a structure and an arrangement of the metal layer elements ME1. Thus, by controlling the structure and the arrangement of the metal layer elements ME1, the plasmonic modulator may be manufactured to include characteristics suitable for its purpose.

Figure 9:
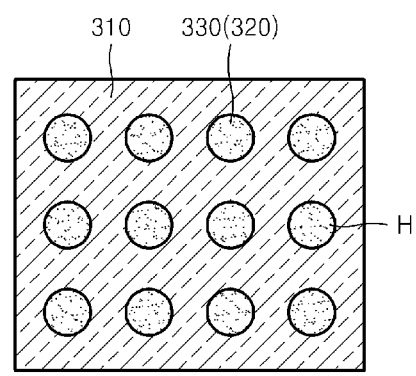
FIG. 9 is a plan view illustrating another example of a resonance type plasmonic modulator.

FIG. 9 is a plan view illustrating another example of a resonance type plasmonic modulator. Referring to FIG. 9, the first metal layer 310, which corresponds to the first metal layer 310 of FIG. 7B, includes openings H, instead of the metal layer elements ME1. Each of the openings H may include a circular disk shape. A distance d between two adjacent centers of the openings H may be less than or equal to $\lambda/2$, for example, less than or equal to $\lambda/3$. In this example, $\lambda$ indicates a resonant wavelength of the resonance type plasmonic modulator. A thickness t of each of the openings H may be less than or equal to $\lambda/5$, for example, less than or equal to $\lambda/10$ and greater than or equal to $\lambda/20$.

Each of the openings H may include various modification structures, such as a cross structure (a), a triangular pyramid structure (b), a sphere structure (c), a hemisphere structure (d), a grain of rice structure (e), an oval disk structure (f), and a stick structure (g), as illustrated in FIG. 8. A resonant wavelength, a resonant wavelength width, resonant polarization characteristics, a resonant angle, an intensity of reflection/absorption/transmission, and phase characteristics of light may vary based on a structure and an arrangement of the openings H.

That is, the first metal layer 310 includes the metal layer elements ME1 or the openings H, and an absorption wavelength, polarization characteristics, and a view angle of light may be adjusted by adjusting the structure and the arrangement of the metal layer elements ME1 or the openings H. Furthermore, the plasmonic modulator modulates a phase of incident light.

Figure 10:
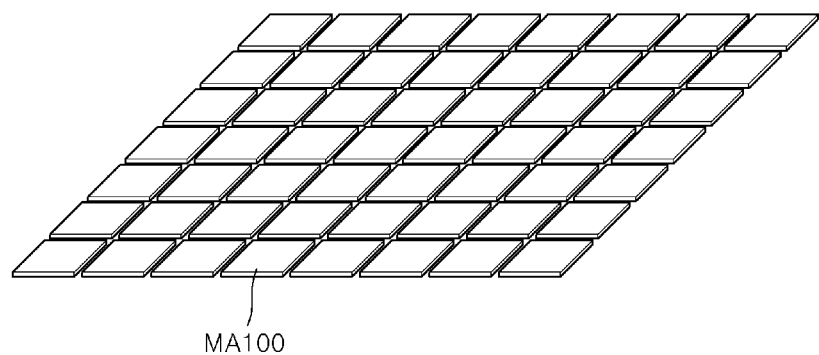
FIG. 10 is a perspective view illustrating an example of an arrangement of unit arrays of metal layer elements used in a plasmonic modulator.

FIG. 10 is a perspective view illustrating an example of an arrangement of unit arrays of metal layer elements used in a plasmonic modulator. That is a structure in which metal layer elements ME1 are periodically arranged (i.e., an array structure) may be a unit structure that forms one pixel (hereinafter, referred to as a unit array structure), and the unit array structure may be repeatedly arranged. An example thereof is illustrated in FIG. 10. Reference numeral MA100 in FIG. 10 indicates the unit array structure. The structure of FIG. 10 may function as a spatial light modulator or plasmonic modulator.

Figure 11:
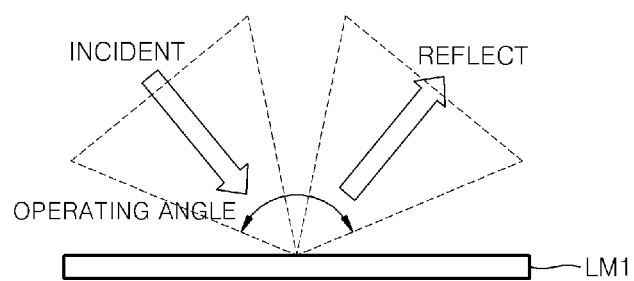
FIG. 11 is a cross-sectional view illustrating an example of an incident light modulation method used by a plasmonic modulator of a reflection type.
Figure 12:
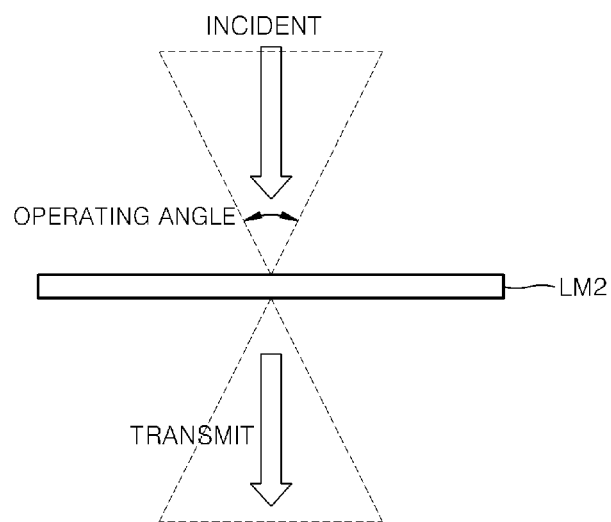
FIG. 12 is a cross-sectional view illustrating an example of an incident light modulation method used by a plasmonic modulator of a transmission type.
Figure 13:
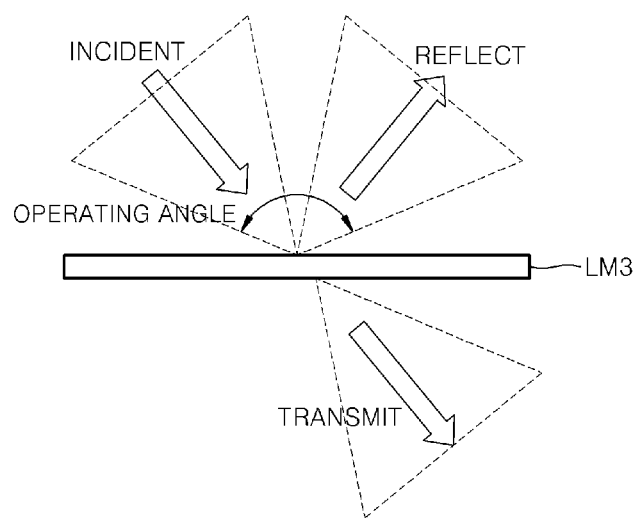
FIG. 13 is a cross-sectional view illustrating an example of an incident light modulation method used by a plasmonic modulator of a semi-transmissive reflection type.

Referring again to FIGS. 7A and 7B, the resonance type plasmonic modulator 70 may be classified into a reflection type, a transmission type, and a semi-transmissive reflection type based on a transmittance of incident light. When the second metal layer 320 is opaque, the resonance type plasmonic modulator 70 is of a reflection type. When the second metal layer 320 is transparent, the resonance type plasmonic modulator 70 is of a transmission type. When the second metal layer 320 is semi-opaque or semi-transparent, the resonance type plasmonic modulator 70 is of a semi-transmissive reflection type. Reflection and transmission type characteristics of the resonance type plasmonic modulator 70 may be adjusted based on a structure of the resonance type plasmonic modulator 70, and a material used in forming the resonance type plasmonic modulator 70. FIGS. 11 through 13 illustrate differences in incident light modulation methods based on a type of the resonance type plasmonic modulator 70.

FIG. 11 is a cross-sectional view illustrating an example of an incident light modulation method used by a plasmonic modulator LM1 of a reflection type. Referring to FIG. 11, the plasmonic modulator LM1 reflects or absorbs light incident at various operating angles and including various polarization structures. The reflected light may be incident on a predetermined detector or an optical system. Reflection or absorption characteristics of the light, such as a phase, an intensity, a polarization, and an operating wavelength of the light, may be modulated based on a variation of a potential difference applied to the plasmonic modulator LM1. That is, the reflection characteristics of the reflected light incident on the detector or the optical system may vary based on the variation of the potential difference applied to the plasmonic modulator LM1.

FIG. 12 is a cross-sectional view illustrating an example of an incident light modulation method used by a plasmonic modulator LM2 of a transmission type. Referring to FIG. 12, the plasmonic modulator LM2 transmits (i.e., through the plasmonic modulator LM2) or absorbs light incident at various operating angles and including various polarization structures. The transmitted light may be irradiated onto a predetermined detector or an optical system. Transmission or absorption characteristics of the light, for example, a phase, an intensity, a polarization, and an operating wavelength of the light, may be modulated based on a variation of a potential difference applied to the plasmonic modulator LM2. That is, the transmission characteristics of the transmitted light irradiated onto the detector or the optical system may vary based on the variation of the potential difference applied to the plasmonic modulator LM2.

FIG. 13 is a cross-sectional view illustrating an example of an incident light modulation method used by a plasmonic modulator LM3 of a semi-transmissive reflection type. Referring to FIG. 13, the plasmonic modulator LM3 may reflect a portion of light incident at various operating angles and including various polarization structure. The plasmonic modulator LM3 may also transmit another portion of the incident light through the plasmonic modulator LM3, and absorb still another portion of the incident light. Reflection, transmission, and/or absorption characteristics of the light may vary based on turning on/turning off the plasmonic modulator LM3, e.g., a variation of a potential difference applied to the plasmonic modulator LM3.

A plasmonic modulator (e.g., the resonance type plasmonic modulator 70 of FIGS. 7A and 7B) may be applied to various optical apparatuses, such as a display, a camera, and/or other optical apparatuses known to one of ordinary skill in the art. For example, the plasmonic modulator may be applied to a color pixel of a display to modulate color.

Figure 14:
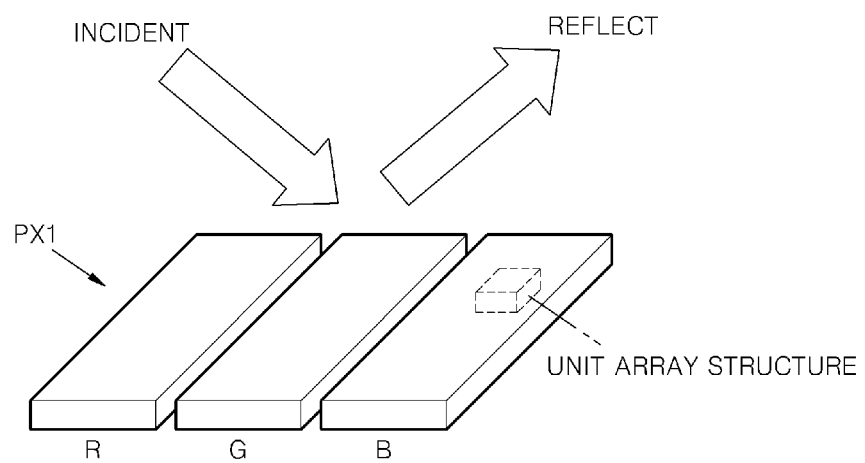
FIG. 14 is a perspective view illustrating an example of a reflection type color pixel to which a plasmonic modulator is applied.

FIG. 14 is a perspective view illustrating an example of a reflection type color pixel PX1 to which a plasmonic modulator is applied. Referring to FIG. 14, the reflection type color pixel PX1 includes, e.g., the resonance type plasmonic modulator 70 of FIGS. 7A and 7B. The reflection type color pixel PX1 includes sub-pixels R, G, and B to modulate various colors. The sub-pixels R, G, and B may modulate red, green, and blue, respectively, and include unit array structures of metal layer elements that are similar to FIG. 10. The reflection type color pixel PX1 reflects incident light.

Although FIG. 14 illustrates the reflection type color pixel PX1 applied to a reflection type display, the plasmonic modulator may be applied to a transmission type display and a semi-transmissive reflection type display for various purposes. In addition, the plasmonic modulator may be applied to a display driven using a constant voltage method and various displays driven using other methods. An overall structure of a display is well known. Accordingly, a display to which the plasmonic modulator is applied, may be driven with a low power at a high speed. The above-described display may be a holographic display generating a hologram.

When the plasmonic modulator is applied to a camera, for example, the plasmonic modulator may be used as a shutter opening or closing a flow of light including a predetermined wavelength. For example, the plasmonic modulator may be used as a shutter opening or closing pulse-shaped light including an infrared (IR) wavelength. In another example, the plasmonic modulator may be used as a shutter modulating a light signal so that a three-dimensional camera may extract depth information based on a time-of-flight method. In still another example, the plasmonic modulator may be used as a solid-state shutter that is driven with a low power and operates at a high speed, for example, about 100 MHz. Structures of a camera and a three-dimensional camera are well known.

The plasmonic modulator may be applied to other optical apparatuses, such as a printer and/or an optical integrated circuit.

According to the teachings above, there is provided a plasmonic modulator including an insulating nitride layer to prevent a short between a metal layer and a refractive index varying layer, of the plasmonic modulator. Thus, a durability of the plasmonic modulator may be increased. When the plasmonic modulator is applied to an optical apparatus, such as a display or a camera, a performance of the optical apparatus may be increased. For example, the plasmonic modulator may be driven with a low power, and may operate at a high speed, and thus, the optical apparatus may achieve a high resolution.

As described above, a refractive index of the refractive index varying layer varies with an electrical signal applied thereto. However, the refractive index of the refractive index varying layer may vary with factors other than the electrical signal. For example, the refractive index may vary with a thermal or mechanical strain on the refractive index varying layer via a contraction/expansion, an electrowetting, and/or other methods known to one of ordinary skill in the art. In this example, a configuration of a unit varying the refractive index of the refractive index varying layer, i.e., a refractive index varying unit, may be different from the above-described configuration. In other words, the above-described optical modulator may operate using a thermal modulation method and/or a mechanical modulation method, other than an electrooptic modulation method.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A plasmonic modulator comprising:
   a first metal layer;
   a second metal layer facing the first metal layer;
   a refractive index varying layer disposed between the first and second metal layers and comprising a varying refractive index;
   an insulating nitride layer disposed between the refractive index varying layer and the first metal layer; and
   an insulating layer disposed between the first and second metal layers and contacting with both the first and second metal layers.

2. The plasmonic modulator of claim 1, wherein the insulating nitride layer comprises an insulating material that is nitrified.

3. The plasmonic modulator of claim 1, further comprising:
   an insulating layer disposed between the first metal layer and the insulating nitride layer, or between the refractive index varying layer and the insulating nitride layer.

4. The plasmonic modulator of claim 3, wherein:
   the insulating nitride layer comprises a portion of an insulating material that is nitrified; and
   the insulating layer comprises a remaining portion of the insulating material.

5. The plasmonic modulator of claim 1, further comprising:
   a first insulating layer disposed between the first metal layer and the insulating nitride layer; and
   a second insulating layer disposed between the refractive index varying layer and the insulating nitride layer.

6. The plasmonic modulator of claim 1, wherein the first metal layer and/or the second metal layer comprises a metal inducing generation of a surface plasmon.

7. The plasmonic modulator of claim 1, wherein the varying refractive index of the refractive index varying layer varies with an electrical signal applied to the refractive index varying layer.

8. The plasmonic modulator of claim 1, wherein the first and second metal layers comprise electrodes applying an electrical signal to the refractive index varying layer.

9. The plasmonic modulator of claim 1, wherein the second metal layer is spaced apart from the first metal layer by a distance of less than or equal to about 100 nm.

10. The plasmonic modulator of claim 1, wherein the refractive index varying layer comprises a transparent conductive oxide.

11. The plasmonic modulator of claim 1, wherein the refractive index varying layer comprises an electrooptic material.

12. The plasmonic modulator of claim 1, further comprising:
   a groove disposed in the second metal layer, wherein the grove has a depth less than a thickness of the second metal layer.

13. The plasmonic modulator of claim 12, wherein the groove is disposed outside a region of the first and second metal layers in which the refractive index varying layer is disposed.

14. The plasmonic modular of claim 1, further comprising metallic elements.

15. The plasmonic modulator of claim 14, wherein a space is disposed between two adjacent ones of the metal layer elements.

16. The plasmonic modulator of claim 14, wherein each of the metallic elements comprises a circular disk structure, or a cross structure, or a triangular pyramid structure, or a sphere structure, or a hemisphere structure, or a grain of rice, or an oval disk, or a stick structure, or any combination thereof.

17. The plasmonic modulator of claim 14, wherein a distance between two adjacent centers of the metal layer elements is less than or equal to $\lambda/2$, $\lambda$ being a resonant wavelength of the plasmonic modulator.

18. The plasmonic modulator of claim 14, wherein the metallic elements are located between the insulating nitride layer and the refractive index varying layer.

19. The plasmonic modulator of claim 18, wherein the metallic elements have a stick structure, and wherein the metal layer elements are slanted to one direction.

20. The plasmonic modulator of claim 1, wherein the first metal layer comprises openings.

21. The plasmonic modulator of claim 20, wherein a distance between two adjacent centers of the openings is less than or equal to $\lambda/2$, $\lambda$ being a resonant wavelength of the plasmonic modulator.

22. The plasmonic modulator of claim 1, wherein the first metal layer comprises cylindrical protrusions disposed in a symmetrical array.

23. The plasmonic modulator of claim 1, wherein the first metal layer comprises cylindrical depressions disposed in a symmetrical array.

24. The plasmonic modulator of claim 1, further comprising:
   an additional insulating layer disposed between the insulating nitride layer and the first metal layer.

25. The plasmonic modulator of claim 1, further comprising:
   an additional insulating layer disposed between the insulating nitride layer and the refractive index varying layer.

26. A plasmonic modulator comprising:
   a first metal layer comprising an interior portion of the first metal layer and an exterior portion of the first metal layer;
   an active layer disposed parallel with the first metal layer, wherein a top surface of the active layer is located adjacent to a bottom surface of the interior portion of the first metal layer;
   an exterior insulating layer disposed coplanar with the active layer, wherein the exterior insulating layer is adjacent to sides of the active layer, and wherein a top surface of the exterior insulating layer is adjacent to a bottom surface of the exterior portion of the first metal layer;
   a second metal layer comprising an interior portion of the second metal layer and an exterior portion of the second metal layer, wherein a top surface of the interior portion of the second metal layer is adjacent to a bottom surface of the active layer, and wherein a top surface of the exterior portion of the second metal layer is adjacent to a bottom surface of the exterior insulating layer; and
   a groove located on the top surface of the exterior portion of the second metal layer,
   wherein the groove is adjacent to the active layer, and
   wherein the groove has a depth less than a thickness of the second metal layer.

27. The plasmonic modulator of claim 26, wherein the exterior insulating layer fills the groove.

28. The plasmonic modulator of claim 26,
   wherein the active layer includes a refractive index varying sub-layer and an insulating nitride sublayer,
   wherein the refractive index varying sub-layer includes a crystalline material of a transparent conductive oxide (TCO), and
   wherein the transparent conductive oxide (TCO) includes at least one of: indium tin oxide (ITO), indium zinc oxide (IZO), aluminum zinc oxide (AZO), and gallium zinc oxide (GZO).

* * * * *